United States Patent Office 3,389,906
Patented June 25, 1968

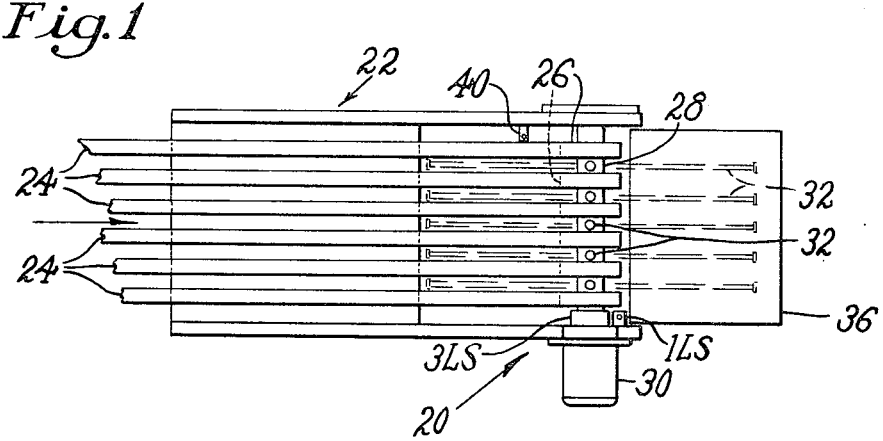
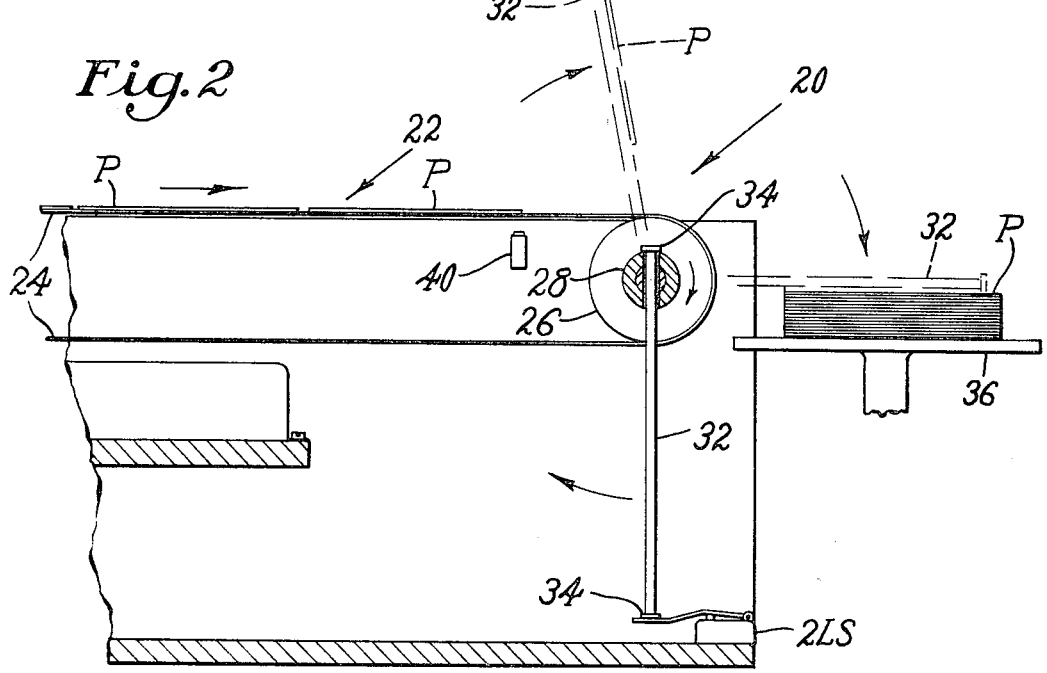

3,389,906
MACHINES FOR STACKING FLEXIBLE SHEETS
Richard R. Walton, Boston, Mass., assignor to United Shoe Machinery Corporation, Flemington, N.J., and Boston, Mass., a corporation of New Jersey
Filed Aug. 1, 1966, Ser. No. 569,297
9 Claims. (Cl. 271—70)

ABSTRACT OF THE DISCLOSURE

A machine for handling sheets of material having automatic means for transferring individual workpieces from a conveyor or other work support to a uniform stack, or into a predetermined marginal relation with a preceding piece. Oscillatory stacking members are cooperative with the conveyor and responsive to arrival of a workpiece on the conveyor for removing the workpiece therefrom and transferring it to the uniform stack or into predetermined relation with a preceding piece.

---

This invention relates to machines for moving sheet-like workpieces successively into predetermined relation to one another. More particularly the invention is concerned with providing improved automatic means for transferring individual flat flexible workpieces, especially of fabric, from a conveyor or other work support to a uniform stack or into an overlying marginal relation with a preceding piece. The invention is herein disclosed in alternate embodiments having particular utility in processing fabric but it will be understood that the invention is not thus limited.

In the garment trades and elsewhere in industry a common problem is to expeditiously and economically attain advantageous positioning of fabric workpieces as they issue singly from a work station. In many instances, before suitable processing can be had at a next station, each piece must be inverted, alternate pieces inverted, or all the pieces stacked vertically, or successive pieces made to overlap, etc. Dull routine "picking up and putting down" of this nature is tedious and has hitherto often required much of the time of a skilled operator attending a machine next to process the work and thus limited the output of the machine and that of the operator.

In view of the foregoing it is a main object of this invention to provide improved sheet stacking machines, especially those adapted for automatically stacking successive pieces of fabric in predetermined relation.

Another object is to provide accurate and reliable, yet simple mechanism for automatically stacking flexible workpieces being fed by a feeding device.

Still another object is to provide simple means cooperative with a conveyor for transferring fabric pieces into a stack wherein their positions are inverted, or wherein their margins predeterminedly overlap.

To these ends, and in accordance with a feature of the invention there is provided in novel alternate embodiments, in combination with a device for feeding sheet-like workpieces in a plane, a work support adjacent thereto, and automatic oscillatory stacking means cooperative with the device and responsive to arrival of a workpiece in selected position upon the feeding device for removing the workpiece therefrom and transferring it to the work support. The several arrangements herein shown and later to be described are selected only by way of illustration of typical problems solved by the invention, the stackers described obviously being useful ahead of or following a great variety of operating stations performing, for example, sewing, bonding, trimming, perforating, folding, or ironing, etc.

The above and other features of the invention, together with various novel details of construction will now be more particularly described in connection with the illustrative stacking machines in which the invention is embodied, and with reference to the accompanying drawings in which:

FIG. 1 is a plan view of a fabric inverting and stacking device cooperative with an endless conveyor;

FIG. 2 is a longitudinal section of the device shown in FIG. 1, oscillatory conveyor-actuated inverting arms being shown in their initial position, and successive later positions in a cycle being indicated by dash lines;

Figure 3:
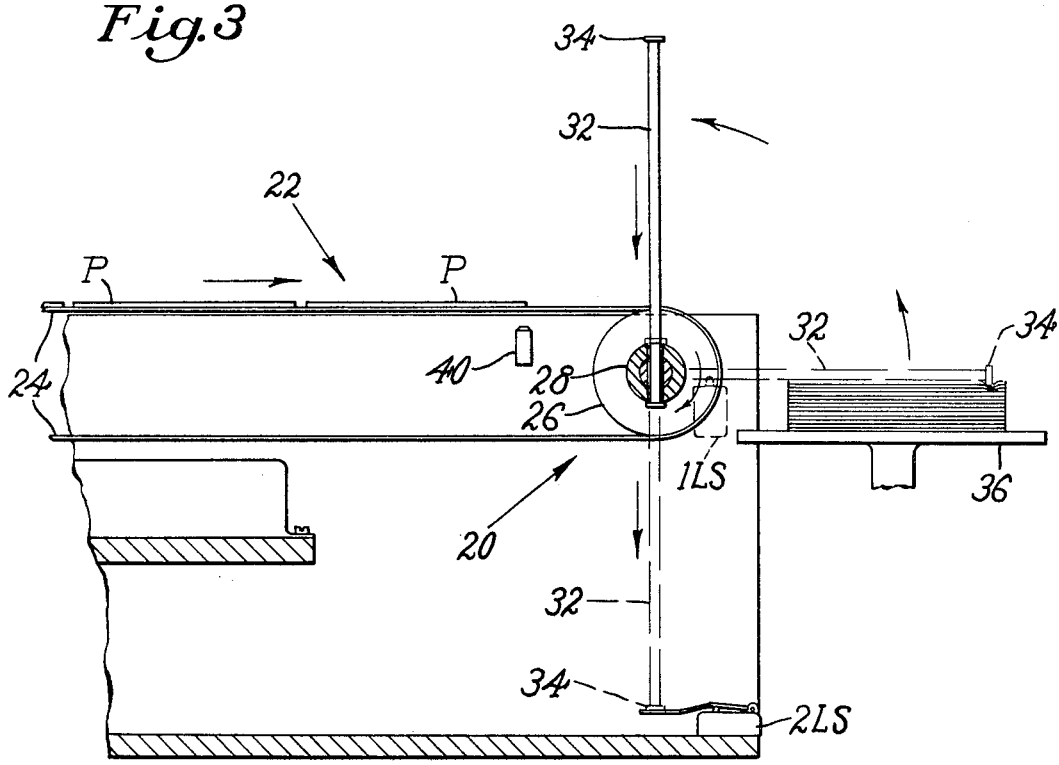
FIG. 3 is a view corresponding to FIG. 2 except that the inverting arms are indicated at subsequent and final positions in the cycle.

FIGS. 1 to 6 inclusive illustrate flexible sheet inverting and stacking mechanism 20 cooperative with a feeder generally designated 22 in the form of an endless conveyor. The latter is adapted to carry successive workpieces P singly and comprises a series of laterally spaced endless belts 24 respectively operating over a pair of longitudinally spaced sets of pulleys, only one set (those designated 26) being shown. The pulleys 26 are continuously rotated or intermittently driven clockwise (by means not shown) as indicated in FIGS. 2 and 3 on an oscillatory shaft 28 which is itself reversibly driven by a 3-lead motor 30 (FIGS. 1 and 5) connected thereto. In the course of a cycle as hereinafter will be described a series of stacking rods 32, provided with enlarged opposite heads 34, is arranged to slide in phase through diametric bores formed in the shaft, the bores and their respective rods being spaced to extend between the adjacent belts 24.

Figure 4:
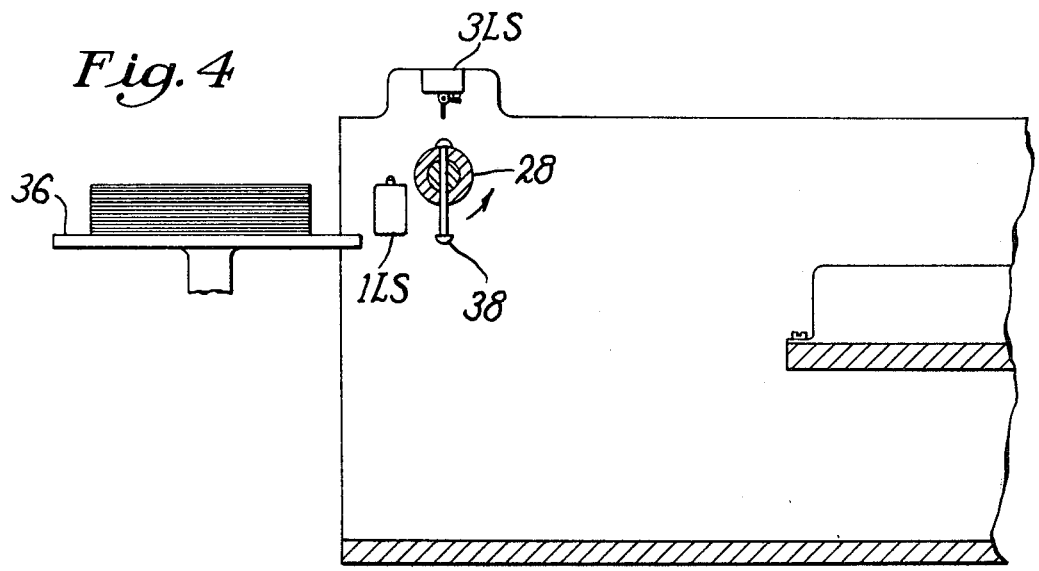
FIG. 4 is a view in back elevation of the machine of FIGS. 2 and 3 and showing certain electrical controls.
Figure 5:
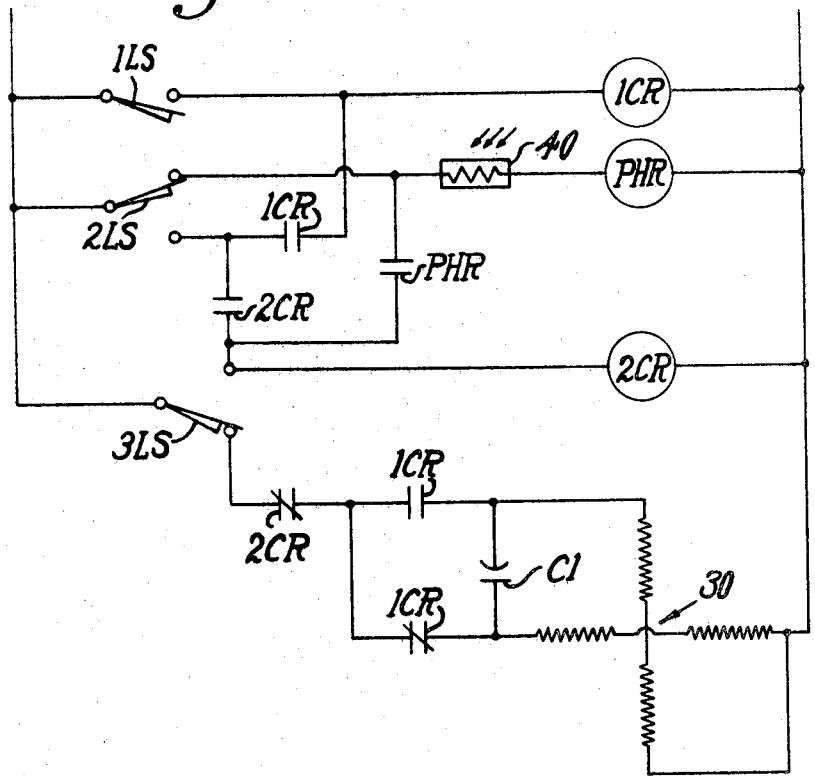
FIG. 5 is a circuit diagram for the machine of FIGS. 1–4 inclusive, the power being assumed to be off.
Figure 6:
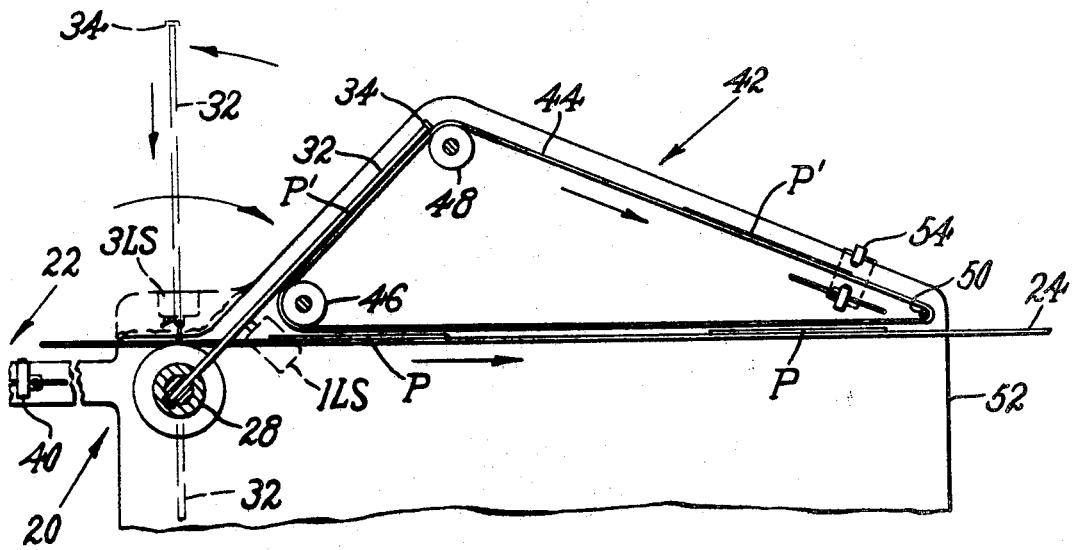
FIG. 6 is a view in side elevation of a machine similar in some respects to that of FIGS. 1–5, but modified to overlay the margins of successive workpieces one of which has been inverted.

The pieces P which may be of fabric or other sheet material being successively conveyed on the belts 24 are to be inverted seriatim by the cyclic action in unison of the rods 32 and then stacked either on a work support 36 mounted adjacent to the delivery end of the conveyor 22 (as shown in FIGS. 2–4) or on a support comprising a second conveyor 42 (as shown in FIG. 6). FIG. 2 shows the rods 32 rotating progressively clockwise 270° from their starting to their intermediate and delivery positions, the rods being prevented from sliding back to their stack position by centrifugal force combined with friction caused by the rotational force couple produced at the shaft 28; FIG. 3 indicates return (i.e., counterclockwise) angular movement of the rods 90° and stopping thereof, followed by their vertical endwise descent under the influence of gravity from a full line position to the starting position indicated by dash lines. The means for automatically controlling operating movements of the stacking rods 32 in this manner will next be described mainly with reference to FIG. 5.

FIG. 5 illustrates the controls with no workpiece as yet in pick-off position. With the conveyor power on, a normally open limit switch 2LS (FIGS. 2 and 5) is initially held closed in the position shown by one of the rods 32 so relays PHR and 2CR are energized; hence normally closed switch 2CR is opened and the inverter motor 30 is then inoperative. As a workpiece to be inverted approaches the delivery end of the feeder 22, the leading workpiece edge intercepts a light beam (not shown) directed to a photocell 40 (FIGS. 2, 3 and 5) secured to the feeder 22 and which is electrically connected to the coil of relay PHR (FIG. 5). In this manner relays PHR and 2CR are de-energized so that the motor 30 is energized through a one-way switch 3LS, the normally closed contact 2CR and a normally closed contact 1CR. The motor swings the rods 32 clockwise from their position shown in FIG. 2 upwardly between the belts 24 to lift and invert the piece P. Movement of the rods permits the switch 2LS to shift to close on its lower contact in FIG. 5. Although the light beam is no longer intercepted, the motor 30 is continuously energized for clockwise rotation as shown in FIG. 2 via the normally closed 1CR and 2CR contacts. The rods 32 rotate clockwise substantially 270° to deposit the piece P on the support 36. At this limit an actuator 38 (FIG. 4) slidably disposed in, and projecting from an end of the shaft 28 is arranged to shift the limit switch 1LS to its closed position thus opening the closed 1CR switch and closing the opened 1CR switch to effect reversal of the motor 30 as indicated in FIG. 3. Upon the rods 32 returning to a nearly vertical position shown by full lines in FIG. 3, the actuator 38 shifts the one-way switch 3LS to its upper contact shown in FIG. 5 thereby energizing the relay 2CR and hence opening the normally closed switch 2CR to stop rotation of the motor 30. The rods 32 are accordingly free to slide downward endwise through their bores in the shaft 28, one of them acting to return the switch 2LS to its original position whereby relay PHR is energized through photocell 40 and relay 2CR is also thereby energized. In like manner, the actuator 38 slides downward to its original position as shown in FIG. 4. The cycle may then be repeated when the next piece P on the belts 24 intercepts light to the cell 40.

FIG. 6 illustrates a variant and perhaps more versatile form of the invention just described, like parts bearing like reference characters. In lieu of providing a stationary work support 36 for receiving a stack of pieces P, it is assumed that the feeder 22 has its belts 24 running beyond the operating locality of the oscillatory shaft 28, its rods 32, and their control motor 30. An endless conveyor generally designated 42 comprising a belt 44 operates about triangularly disposed rolls 46, 48 and 50, the upper reachs feeding in the same general direction as the feeder 22 but angularly thereover. A frame 52 is provided for mounting the inverting mechanism 20 and the conveyor 42, the lower or return reach of the belt 44 being spaced to avoid interference with non-inverted pieces P to be fed through on the feeder 22. Means, for example a time delay mechanism (not shown), is provided for causing only every other workpiece to initiate clockwise inversion driving of the motor 30. It is assumed that the fabric pieces P are equispaced on the conveyor 22, that they are of uniform length in the direction of feeding, and that a motor (not shown) when operative, drives the conveyor 42 enough faster than the feeder 22 that an alternative workpiece P' (FIG. 6) inverted by the mechanism, although traversing an arcuate, plus a different linear distance, will descend with its leading edge exactly alined with the leading edge of the non-inverted piece P which had previously preceded the inverted piece. The frame 52 supports the rods 32 for a clockwise oscillation on the order of 225° in this instance, their limit of angular inverting travel being determined by the limit switch 1LS which is accordingly positioned on the frame 52 to correspond with the angle of elevation of the belt 44 extending between the rolls 46 and 48.

The arrangement shown in FIG. 6, instead of being used as explained to match leading edges of pieces P and P', one of which has been inverted, may include a control circuit comprising an adjustably mounted light and photocell unit 54 for momentarily interrupting operation of the conveyor 42, upon beam interception by the leading edge of the piece P', for an interval determined by time delay mechanism (not shown). In this way the inverted piece P' may be caused to be superposed upon the piece P with a leading edge lagging that of the piece P by a selected amount of as much as the length of the latter measured along its direction of feed. Successive juxtapositioned workpieces are thereafter carried by the belts 24 to a following sewing or other processing station.

From the foregoing it will be appreciated that each of the illustrative machines is of simple and inexpensive construction and capable of transferring successive workpieces from one position to another and, if desired, in selected relation with respect to a preceding workpiece.

While the invention has been shown in but two forms, it will be obvious to those skilled in the art that it is not so limited, but is susceptible of various changes and modifications without departing from the spirit thereof.

Having thus described my invention, what I claim as new and desire to secure by Letters Patent of the United States is:

1. Mechanism for inverting and stacking workpieces of sheet material comprising a conveyor for moving the pieces seriatim along their general plane, a work support adjacent the conveyor, a plurality of members slidably mounted relative to said plane and swingable from an initial position beneath said plane in an arcuate path extending through said plane and ending at the support, means actuated upon arrival of a workpiece at said path for swinging the members through said path for removing the workpiece from the conveyor and depositing it inverted on the support and means actuated upon arrival of the members at the support to reverse rotation of said members to a position wherein the members slide to assume a position beneath said plane.

2. Mechanism as set forth in claim 1 wherein the conveyor comprises a plurality of spaced carrier belts, said mechanism further comprising a rotatable shaft extending transversely of the conveyor beneath a reach of said belts, and wherein said members include a plurality of spaced stacking rods radially projecting from the shaft and mounted in said shaft for rotation therewith between the belts of said reach.

3. The mechanism described in claim 2 which further comprises a control means including a reversible motor connected to said shaft and automatically responsive to arrival of a workpiece on the conveyor to a predetermined locality in the vicinity of said rods to rotate them in unison whereby the piece is lifted and inverted for deposit upon the work support.

4. Mechanism as set forth in claim 3 wherein the rods are mounted for radially slidable movement endwise through the shaft under the influence of gravity when disposed substantially in the vertical position and the control means is further responsive to arrival of the rods in generally parallel relation to the work support to effect reversal of the motor and stopping of motor when the rods are substantially in the vertical position and hence to position the rods for the sliding movement by gravity.

5. Mechanism as set forth in claim 4 wherein the control means includes a circuit operatively connected to the motor, said circuit comprising a photocell associated with the conveyor ahead of the shaft, a pair of limit switches one of which is actuatable by at least one of said rods prior to its inverting operation and another of which is actuatable by at least one of the rods at delivery of the piece to the work support, and a third limit switch operable by one of the rods in the course of the reverse operation of said motor to stop such operation and enable the rods to slide by gravity through the shaft for the actuation of said one limit switch.

6. Mechanism according to claim 1 wherein the conveyor is a through feed conveyor and the support includes means for re-depositing the inverted workpiece on the conveyor.

7. Mechanism according to claim 6 wherein the depositing means includes a second conveyor having a delivery end adapted to deposit the inverted workpiece on the through feed conveyor.

8. Mechanism according to claim 6 wherein the actuated means is operable to cause swinging of said members upon arrival of alternate workpieces moved by the conveyor whereby the inverted workpieces are deposited in superposed position with non-inverted workpieces on the through feed conveyor.

9. Mechanism according to claim 8 wherein the depositing means includes a second conveyor with a selected speed different from that of the through feed conveyor for depositing the inverted workpieces in a selected superposed relation relative to the non-inverted workpieces on the through feed conveyor.

References Cited

UNITED STATES PATENTS

| | | | |
|---|---|---|---|
| 2,817,306 | 12/1957 | Oakes | 198—33.4 |
| 2,910,017 | 10/1959 | Oakes | 107—1.6 |
| 3,182,617 | 5/1965 | De Laittre | 112—10 |

RICHARD E. AEGERTER, *Primary Examiner.*